United States Patent [19]

Yamada

[11] Patent Number: 5,371,637
[45] Date of Patent: Dec. 6, 1994

[54] DISK APPARATUS

[75] Inventor: Tadaharu Yamada, Ibaragi, Japan

[73] Assignee: NEC Corporation, Tokyo, Japan

[21] Appl. No.: 992,722

[22] Filed: Dec. 18, 1992

[30] Foreign Application Priority Data

Dec. 18, 1991 [JP] Japan .................. 3-353745

[51] Int. Cl.⁵ .............................. G11B 21/02
[52] U.S. Cl. .................. 360/75; 360/73.03; 360/77.02
[58] Field of Search .......... 360/75, 105, 103, 73.03, 360/77.02

[56] References Cited

U.S. PATENT DOCUMENTS

| 4,202,020 | 5/1980 | Lovgren et al. | 360/75 |
| 4,430,440 | 2/1984 | Wada et al. | 360/103 |
| 4,755,896 | 6/1988 | Okutsu | 360/75 |

FOREIGN PATENT DOCUMENTS 63-86169  4/1988  Japan .
01119957  5/1989  Japan .

Primary Examiner—Aristotelis Psitos
Assistant Examiner—Varsha A. Kapadia
Attorney, Agent, or Firm—Sughrue, Mion, Zinn, Macpeak & Seas

[57] ABSTRACT

In a disk apparatus of contact-start-stop system, a head slider carries out a contact-start-stop operation at a non-specified position taken in the radial direction of a disk-shaped recording medium. This can be achieved by entering a random signal from a random number generator to a means for positioning the head slider in the radial direction of the disk when the recording medium begins to stop rotating. Accordingly, the head slider can be effectively inhibited from adhering to the disk, and the disk becomes unlikely to suffer wear, damage and head crash, and further, many information tracks can be formed on the disk.

1 Claim, 3 Drawing Sheets

DISK APPARATUS

FIELD OF THE INVENTION

The present invention relates to a disk apparatus for reading and writing information from and on a rotating disk-shaped recording medium by using a floating head slider and, in particular, to a disk apparatus of contact-start-stop system in which the floating head slider comes in contact with the recording medium when the disk-shaped recording medium stops rotating.

BACKGROUND OF THE INVENTION

A disk apparatus moves a head on a rotating disk-shaped recording medium (hereinafter merely referred to as a disk) in the radial direction of the disk to position at a predetermined track, relative to which the head is scanned to read and write necessary signals. Among such disk apparatus, one using a floating head slider arranged by loading the head on the slider utilizing the principle of a dynamic pressure type pneumatic bearing has been widely used because it allows the clearance between the head and the disk to be held extremely fine and highly accurate. When this floating head slider is used, a so-called contact-start-stop (CSS) system forms an important system in order to simplify and make miniaturized the mechanism of the interior of tile disk apparatus, in which when the disk is not rotating tile slider comes in contact with the disk, as the disk starts to rotate the slider gradually floats up, when the disk is steadily rotating the slider holds a predetermined clearance relative to the disk and as the disk stops rotating the slider touches down on the disk again.

A conventional disk apparatus made according to this CSS system has read and written the information from and on the disk as shown in FIG. 1. That is, the surface of a disk 1 is sectioned into a data area 2 and a CSS area 3 which lies innerer than that, and the information track 4 is previously formed only on the data area 2 while the slider is made to touch down only on the CSS area 4 where no information track is formed to control the position of the slider taken in the radial direction of the disk. This is in order to eliminate the damage of the data area which can be caused by its contact with the slider to prolong the lifetime of the disk. Such a disk apparatus is described in, for example, U.S. Pat. No. 4,907,106.

However, as described above, with the conventional disk apparatus, since the CSS area 3 of the disk 1 intensively and repeatedly comes in contact with the slider, as the number of times of the CSS is increased, a lubricant applied on the surface of the CSS area 3 is removed, and the disk 1 and the slider have often been adhered. Further, since only the CSS area 3 repeatedly comes in contact with the slider, this area has been especially susceptible to the wear and damage leading to the troubles such as head crash or the like. Further, with the conventional disk apparatus, since there is provided the CSS area where no information track is formed, the size of the data area 2 has undergone a limit.

SUMMARY OF THE INVENTION

The present invention was made in view of the foregoing problems, and its object is to provide a disk apparatus of CSS system which may effectively prevent the head slider from being adhered to the disk.

Another object of the present invention is to provide a disk apparatus of CSS system in which the disk is unlikely to undergo the wear and damage and the head crash is unlikely to result.

A still further object of the present invention is to provide a disk apparatus of CSS system which allows many information tracks to be formed on the disk.

According to the present invention, in order to achieve the foregoing ends, there is provided a disk apparatus of contact-start-stop system comprising a means for retaining and rotating a disk-shaped recording medium and a floating head slider which, when the disk-shaped recording medium rotates, floats toward its surface with a minor interval retained, when the disk-shaped recording medium stops rotating, the head slider coming in contact with the surface of the disk-shaped recording medium, in which the head slider carries out a contact-start-stop motion at a non-specified position taken in the radial direction of the disk-shaped recording medium.

In one embodiment of the present invention, when the disk-shaped recording medium is going to stop rotating, a random signal is entered to a means for positioning the head slider in the radial direction of the recording medium so that the head slider carries out the contact-start-stop motion at the non-specified position taken in the radial direction of the disk-shaped recording medium. This may be realized by using, for example, a random number generator as the means for generating the random signal.

In another embodiment of the present invention, if the disk-shaped recording medium continues rotating for a pre-determined period of time without the contact-start-stop motion, it is arranged so that the contact-start-stop may be carried out at least once.

According to the present invention, in the disk apparatus of contact-start-stop system, since the head slider carries out the contact-start-stop motion at the non-specified position taken in the radial direction of the disk-shaped recording medium, it can effectively be inhibited for the head slider from being adhered to the disk, which makes the disk unlikely to suffer wear and damage and makes the head crash unlikely to occur while at the same time eliminating the need to provide the contact-start-stop area with the result that it becomes possible to form many information tracks.

DETAILED DESCRIPTION OF THE PREFERRED EMBODIMENTS

Specific embodiments of tile present invention are hereinafter described with reference to the drawings.

Figure 2:
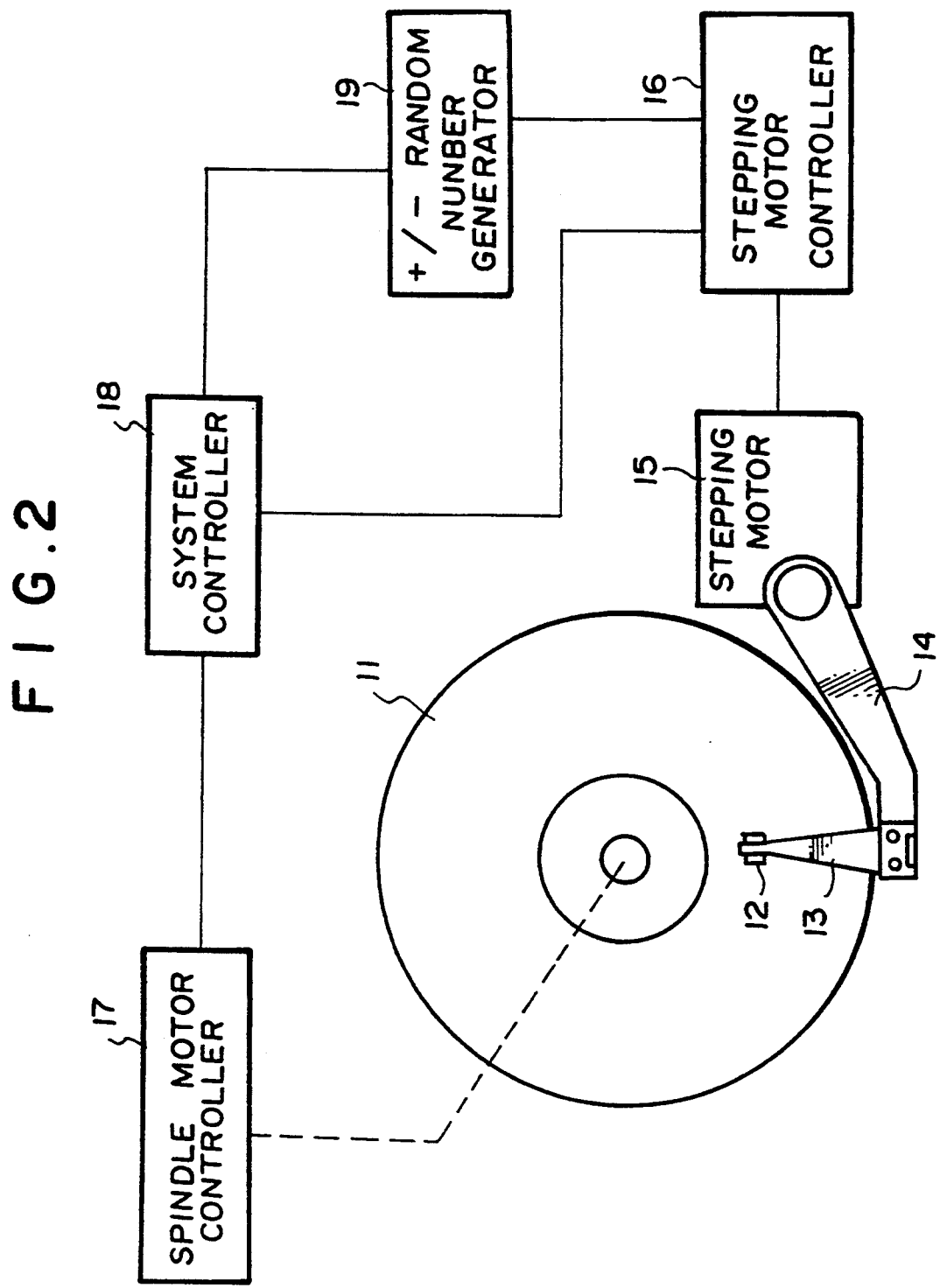
FIG. 2 is a schematic view of the arrangement of a specific embodiment of the disk apparatus according to the present invention.

FIG. 2 is a schematic view of the arrangement of a specific embodiment of tile disk apparatus according to the present invention, in which reference numeral 11 denotes a disk, which is driven for rotation by means of a spindle motor (not shown). The disk 11 is generally called a 3.5 inch disk, in which after a magnetic film is formed by sputtering on the surface of, for example, an aluminum alloy substrate of diameter of 95 mm a carbon protective film is formed on its surface by sputtering and further, on that surface, fluorine fats and oils are applied to a thickness of several tens of Å as a lubricant.

12 denotes a floating head slider which is disposed adjacent to the surface of the disk 11. The slider is mounted to a suspension member 13 flexible in the direction perpendicular to the disk surface, and the suspension member is connected to a stepping motor 15 via a rigid arm 14. The slider 12 is made to contact the surface of the disk 11 based on a minor energizing force, that is, a spring-loaded force caused by the suspension men, bet 13 when the disk 11 stops rotating, and when the disk 11 rotates, it carries out the so-called CSS operation in which it floats with a proper air clearance from the surface of the disk 11 against the force energized by the suspension member 13. At least the side of the slider 12 which contacts the disk 11 is preferably made of $Al_2O_3$—TiC, but may be made of ferrite or Ti—Ca ceramic or the like.

The foregoing stepping motor 15 is driven and controlled by means of a stepping motor controller 16. Further, the foregoing spindle motor is driven and controlled by means of a spindle motor controller 17. These controllers 16, 17 are controlled by a system controller 18. In this embodiment, a ± random number generator 19 is used, and the random numbers generated therein are entered to the stepping motor controller 16. The ± random number generator 19 is controlled by the system control let 18.

Figure 1:
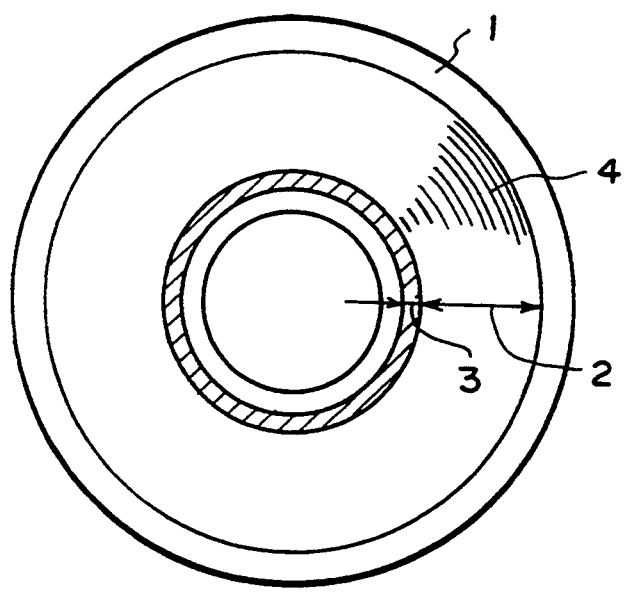
FIG. 1 is a plan view of a disk used in a conventional disk apparatus of CSS system.
Figure 3:
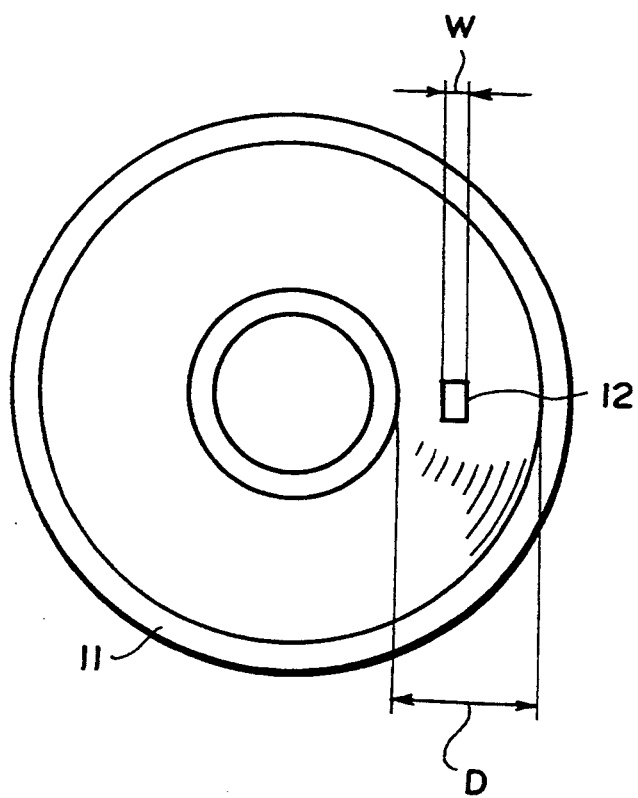
FIG. 3 is a plan view of a positional relationship between a head slider and a disk for the disk apparatus of FIG. 2.

Next, the operation of this embodiment is described. When the disk 11 is rotating in a steady state, if a CSS instruction signal for stopping the rotation of the disk is sent from the system controller 18 to the spindle motor controller 17, the spindle motor starts to decelerate from the steady rotating state. On the other hand, immediately before the CSS instruction signal is emitted, an instruction signal for generating random numbers is sent from the system controller 18 to the ± random number generator 19, where random numbers are generated based on the instruction signal to be entered to the stepping motor controller 16. The stepping motor controller 16 controls the rotational angle of the stepping motor 15 so as to move the slider 12 up to a cylinder corresponding to the entered random numbers in the substantially radial direction of the disk. Thus the slider 12 can be moved up to a position random and non-specified in terms of probability in the radial direction of the disk 11. Thereafter, the spindle motor stops rotating and the slider 12 comes in contact with the surface of the disk 11. Incidentally, when the disk 11 starts to rotate from the state in which it stops rotating, an instruction signal is sent from the system controller 18 to the spindle motor controller 17, based on which the spindle motor starts to rotate, but the instruction signal for generating random numbers is not sent to the ± random number generator 19, and therefore, the slider 12 is not moved by the stepping motor FIG. 3 is a plan view illustrating a positional relationship between the glider 12 and the disk 11 of the disk apparatus of FIG. 2. As illustrated, assuming that the width of the data area of the disk 11 be D and the width of the slider 12, that is, the length taken in the radial direction of the disk be W, in this embodiment, since the CSS operation is conducted as described above, the probability in which the CSS operation is conducted at the specific position taken in the radial direction of the disk equals W/D. In consequence, as compared with the conventional case in which the CSS operation is always conducted in the CSS area at the specified position taken in the radial direction, the frequency with which the lubricant on the surface of the disk 11 is removed is also reduced to W/D, and the lifetime is prolonged to D/W times. Here, W/D is, for example, 0.08 to 0.15, D/W is, for example, 6.7 to 12.5 and the utility of the present invention is high.

Figure 4:
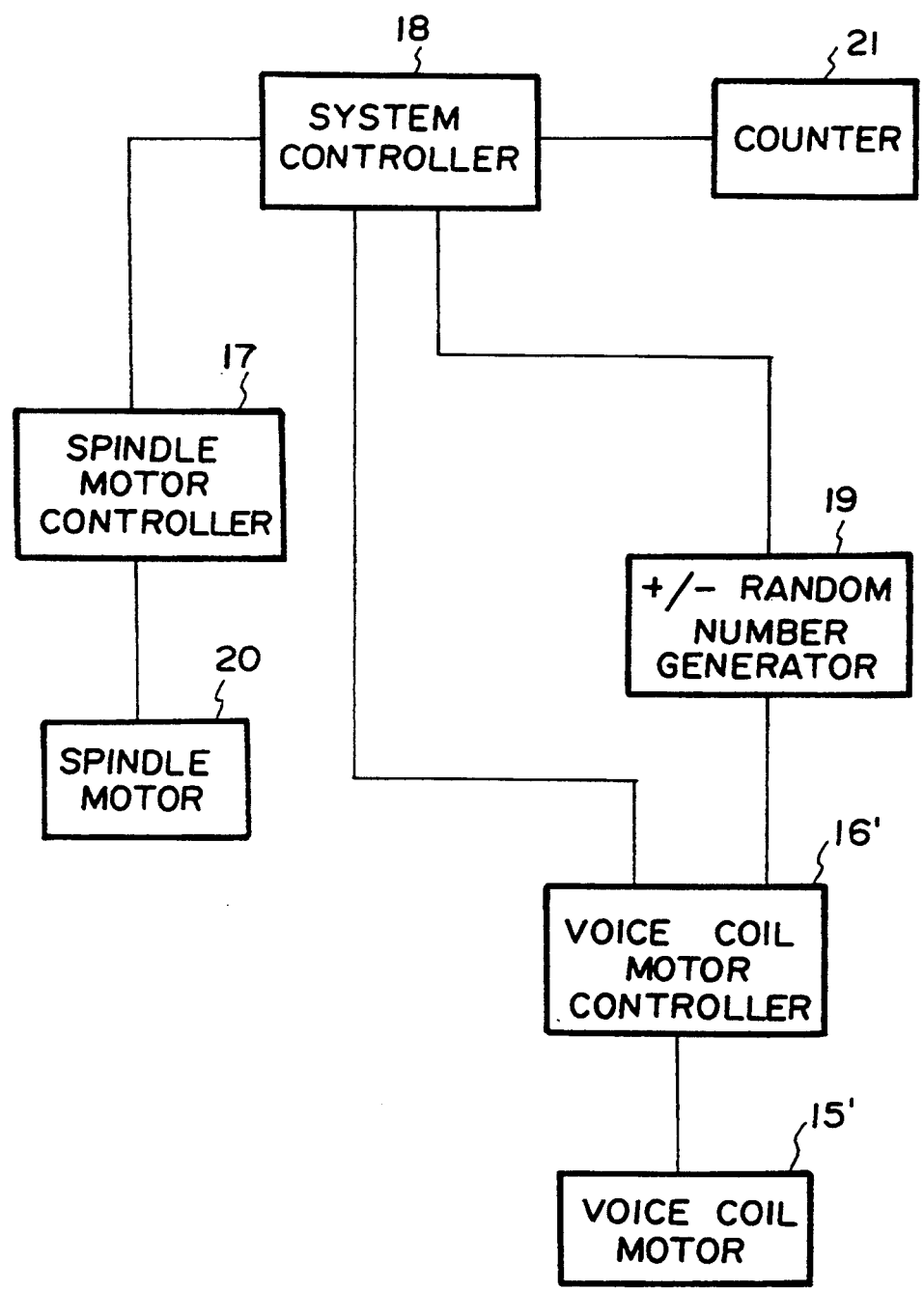
FIG. 4 is a schematic view of the arrangement of another embodiment of the disk apparatus according to the present invention.

FIG. 4 is a schematic view of the arrangement of another embodiment of the disk apparatus according to the present invention. In this embodiment, in place of the stepping motor 15 of the embodiment of FIG. 2, a voice coil motor 15' is used, which is driven and controlled by means of a voice coil motor controller 16'. Further, the spindle motor 20 is driven and controlled by means of the spindle motor controller 17. These controllers 16', 17 are controlled by the system controller 18. The random numbers generated at the ± random number generator 19 are entered to the voice coil motor controller 16'. The ± random number generator 19 is controlled by the system controller 18. In this embodiment, a counter 21 is used, which measures the time which elapses after the spindle motor 20 start to rotate, and sends a signal to the system controller 18 each time a preset time elapses. The counter 21 is controlled by the system controller 18.

Next, the operation of this embodiment is described. In this embodiment, other than that the operation as in the embodiment of FIG. 2 is conducted, also when the signal from the counter 21 is entered to the system controller 18, similar CSS operation is compulsorily carried out. That is, the CSS instruction signal for stopping the rotation of the disk is sent from the system controller 18 to the spindle motor controller 17, and the spindle motor 20 starts to decelerate from the steady rotating state. On the other hand, immediately before this CSS instruction signal is emitted, the instruction signal for generating random numbers is sent, from the system controller 18 to the ± random number generator 19, where random numbers are generated based on the instruction signal to be entered to the voice, coil motor controller 16', which controls the rotational angle of the voice coil motor 15' so as to move the slider up to the cylinder corresponding to the entered random numbers in the substantially radial direction of the disk to thereby move the slider up to a position random and non-specified in terms of probability in the radial direction of the disk. Thereafter, the spindle motor 20 stops rotating, and the slider comes in contact with the surface of the disk.

In this embodiment, since the CSS operation is compulsorily executed when the preset time comes, the slider cannot float on the disk over a long period of time. Thus, if the slider floats on the disk over the long period of time, dust keeps on adhering to the sliding surface of the slider to generate the head crash. But, in this embodiment, if the CSS operation is compulsorily executed at least once a predetermined period of time after the disk starts to float, then it can be prevented for much dust from adhering to the sliding surface of the slider to prevent the generation of the head crash.

The present invention is especially effective when a disk of diameter of below 100 mm is used. For although in the conventional disk apparatus using such a small diameter disk the length of the CSS area taken in the circumferential direction is short and each portion of the CSS area frequently comes in contact with the slider, which remarkably causes the foregoing problems, they can effectively avoided according to tile present invention.

The present invention is not restricted to the foregoing embodiments, but various modifications can be made within the scope of the claims.

What is claimed is:

1. Disk apparatus of a contact-start-stop system comprising.;
    a means for retaining and rotating a disk-shaped recording medium;
    a floating head slider which floats keeping a minor clearance relative to the surface of said recording medium when said recording medium rotates, said head slider coming in contact with the surface of said recording medium when said recording medium stops rotating;
    a positioning means for positioning said head slider in a radial direction of said disk-shaped recording medium, wherein said positioning means positions said head slider at a non-specified position taken in the radial direction of said recording medium when said recording medium begins to stop rotating so that said head slider carries out a contact-start-stop operation at said non-specified position; and
    a random signal generating means for generating a random signal, wherein, after said recording medium starts to decelerate from a steady rotation and before said recording medium stops the rotation, said positioning means positions said head slider at said non-specified position based on a random signal generated by said random signal generating means and thereafter entered to said positioning means.

* * * * *